United States Patent [19]

Jutte

[11] 4,207,387
[45] Jun. 10, 1980

[54] CONTAINER FOR A REMOTELY-VENTED BATTERY

[75] Inventor: Gottfried W. Jutte, Indianapolis, Ind.

[73] Assignee: The Richardson Company, Des Plaines, Ill.

[21] Appl. No.: 935,251

[22] Filed: Aug. 21, 1978

[51] Int. Cl.$^2$ .................................. H01M 2/12
[52] U.S. Cl. ......................................... 429/88
[58] Field of Search .................... 429/82, 88, 87

[56] References Cited

U.S. PATENT DOCUMENTS

| | | | |
|---|---|---|---|
| 2,530,539 | 11/1950 | Raney et al. | 429/88 |
| 3,329,531 | 7/1967 | Hennen | 429/88 |
| 3,494,798 | 2/1970 | Teeter et al. | 429/88 |
| 4,107,398 | 8/1978 | Lindenberg et al. | 429/88 |

*Primary Examiner*—Donald L. Walton

*Attorney, Agent, or Firm*—Lockwood, Dewey, Alex & Cummings

[57] ABSTRACT

A container for a remotely-vented lead-acid storage battery includes a multi-compartment base containing individual cells of the battery and an overlying cover in vapor-sealed engagement with the base. A gas collection manifold positioned within a recess in the bottom surface of the cover includes a plurality of interconnected expansion chambers which communicate with respective ones of the battery cell compartments, and a discharge port exterior to the battery container. Battery gas collected within the expansion chambers is conveyed within the manifold to the discharge port, thereby avoiding the need for additional gas collection elements external to the cover and the attendant possibility of leakage of battery gas in the vicinity of the battery.

30 Claims, 8 Drawing Figures

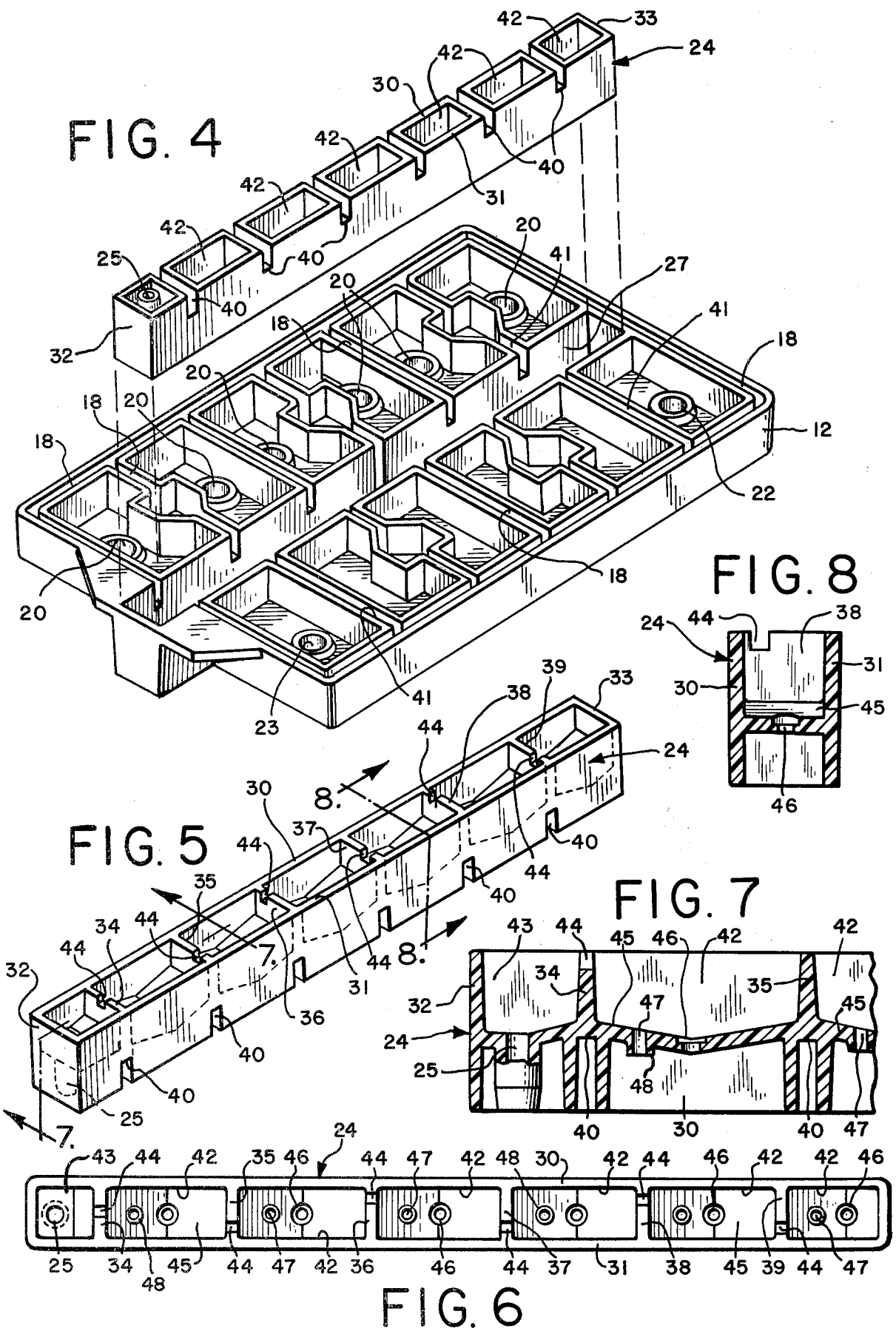

CONTAINER FOR A REMOTELY-VENTED BATTERY

BACKGROUND OF THE INVENTION

This invention is directed generally to containers for electrical batteries, and more particularly to a container for a remotely-vented multi-cell lead-acid battery such as utilized in snowmobiles, riding lawn mowers, and other utility vehicles.

Electrical storage batteries of the lead-acid type typically comprise a plurality of individual cell compartments each having a filler well through which electrolyte is replenished and through which hydrogen and oxygen gases generated within the cell compartment during operation of the battery are egressed. Vented caps installed over the filler wells prevent the electrolyte from spilling or splashing out of the compartments while allowing gases developed therein to be vented.

With the advent of small electrically-driven vehicles such as golf carts, and small gasoline-driven vehicles such as lawn tractors, snowmobiles and motorcycles, wherein it is necessary to position a lead-acid battery in close proximity to an operator, or wherein the battery is to be placed in the passenger compartment of an automobile, the need arises for a remotely-vented battery wherein gas egressing from the individual cells of the battery is conveyed through tubing or by other appropriate means to a remote location prior to being released to the atmosphere. This precludes the possibility of the operator breathing the escaping battery gas, and reduces the possibility of ignition or chemical reaction of the gas with components of the vehicle.

Unfortunately, prior art containers for remotely-vented batteries have been undesirably expensive to produce, primarily as a result of utilizing cover constructions which required an unnecessarily large number of components and which were unnecessarily difficult to assemble. For example, in one such prior art construction a battery cover was provided with a channel on its top surface which extended the length of the cover body and opened into each of the cell compartments of the battery. A gas collection manifold was positioned in the channel to convey gas generated within each of the cell compartments to a single gas discharge port. A strip-shaped cover was bonded to the top surface of the cover over the channel following placement in the channel of the gas collection manifold to secure the manifold in position and prevent gas leakage.

In another prior art construction a channel was similarly provided on the top surface of the battery cover, and individual vent apertures were provided extending from the channel through the cover into the respective cell compartments of the battery. Battery gases passing through the vent apertures into the channel were confined to the channel for conveyance to a discharge port by means of a cover bonded over the top of the channel.

Both of these prior art constructions had the disadvantage of requiring the bonding of a cover over a channel on the top surface of the battery cover body. Not only did this increase the cost of manufacture, but it also increased the possibility of an inadvertent leak of battery gas developing as a result of incomplete bonding of the cover to the cover body surface.

Accordingly, it is a general object of the present invention to provide a new and improved battery container for a remotely-vented battery.

It is another object of the present invention to provide a container for a remotely-vented battery which is simpler in construction and less expensive to manufacture, and which does not require bonding of an external cover member to the base of the battery cover.

It is another object of the present invention to provide a container for a remotely-vented battery wherein the container cover requires any two members which are joined during assembly without the need for a separate bonding operation.

SUMMARY OF THE INVENTION

The invention is directed to a container for a remotely-vented multi-cell battery. The container includes a cover having a recess on its bottom surface which opens into each of the cell compartments and to the exterior of the battery. Venting of battery gas generated within the cell compartments is accomplished by a gas collection manifold seated in the recess. The manifold includes a plurality of vent apertures which open into respective ones of the cell compartments, and a discharge port in vapor communication with the vent apertures which opens to the exterior of the battery compartment. In a preferred embodiment, the gas collection manifold is a one-piece molded member having dimensions corresponding substantially to the dimensions of the recess whereby vapor communication between the cell compartments and the exterior of the battery is restricted to the manifold when the cover is joined to the walls of the battery container.

The invention is further directed to a cover as described above for use in conjunction with a battery container having side and end walls, and a plurality of interior divider walls, wherein the bottom surface is adapted for vapor-sealed engagement with the container walls to restrict gas flow from the cell compartments of the battery to the manifold.

The invention is further directed to a method of forming a battery container as described above, wherein the gas collection manifold is retained within the recess upon joinder of the cover to the container side walls without the need for additional bonding or sealing operations.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in connection with the accompanying drawings, in the several Figures of which like reference numerals identify like elements, and in which:

FIG. 4 is an exploded perspective view of the underside of the battery container cover and the gas collection manifold provided therein.

FIG. 5 is an enlarged perspective view of the gas collection manifold.

FIG. 6 is a bottom view of the gas collection manifold showing the vent ports provided therein.

FIG. 7 is a cross-sectional view of the gas collection manifold taken along line 7—7 of FIG. 5 showing the interior construction thereof.

FIG. 8 is a cross-sectional view of the gas collection manifold taken along line 8—8 of FIG. 5.

DESCRIPTION OF THE PREFERRED EMBODIMENT

Figure 1:
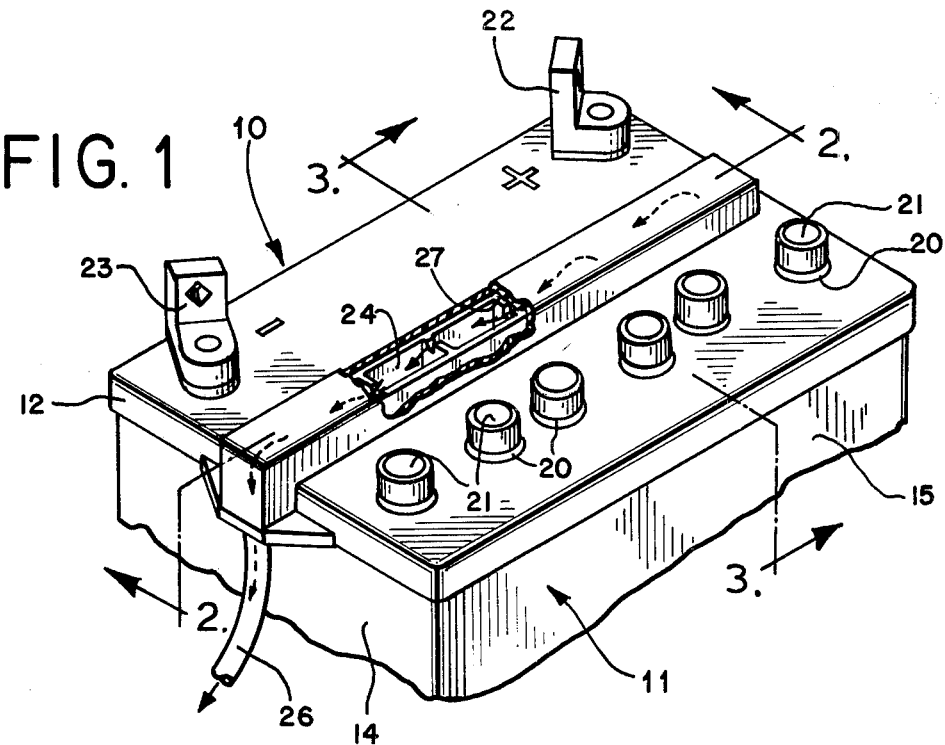
FIG. 1 is a perspective view of a cover for the container of a remotely-vented battery constructed in accordance with the invention.
Figure 2:
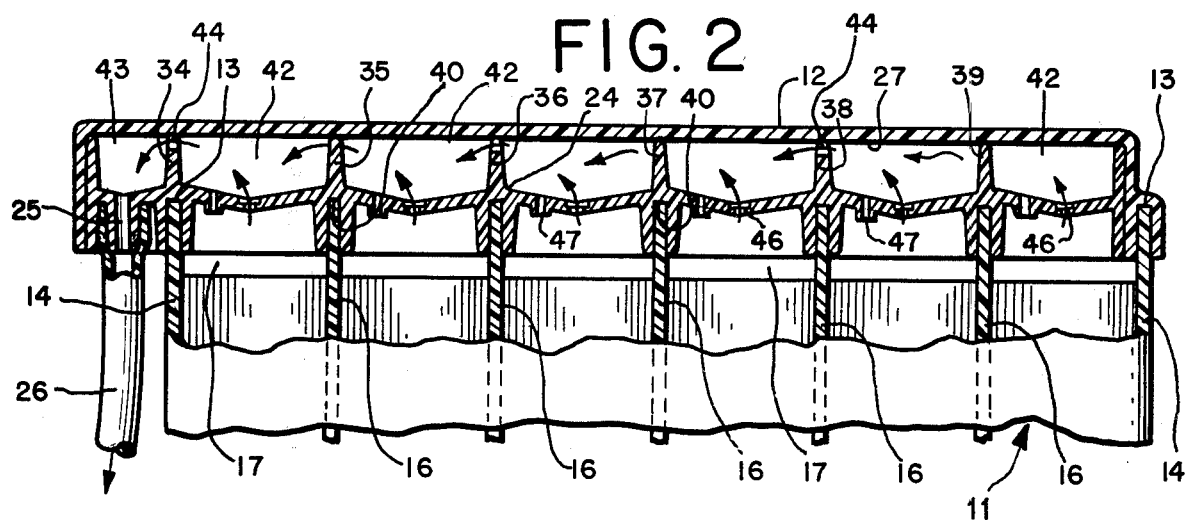
FIG. 2 is an enlarged cross-sectional view of the the battery container cover taken along the line 2—2 of FIG. 1.
Figure 3:
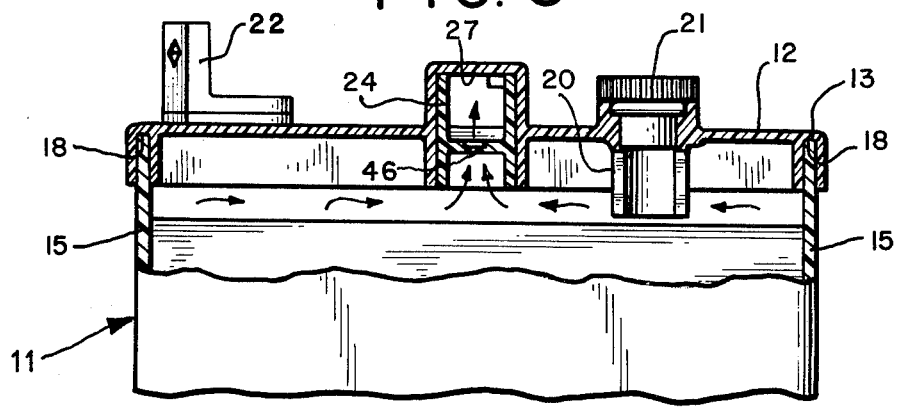
FIG. 3 is an enlarged cross-sectional view of the battery container cover taken along line 3—3 of FIG. 1.

Referring to the Figures, and particularly to FIGS. 1-3, a battery container 10 for use with a multi-cell lead-acid battery is seen to include a generally rectangular cover body 12 adapted to receive in bonded vapor-sealed engagement the edges 13 of the end walls 14, side walls 15 and interior divider walls 16 of the base container. In accordance with conventional practice, the interior walls 16 divide the battery container base into individual compartments 17, within which individual cells of the battery are contained. In the illustrated embodiment, which is intended to deliver approximately 12 VDC, five such divider walls are provided to form six cell compartments within the container. With the exception of the container as described herein, the battery may be entirely conventional in design and construction, utilizing known electrode materials and electrolyte solution in each cell compartment with known interconnection techniques to develop the desired output voltage. For improved mechanical strength, appropriately dimensioned slots or recesses 18 may be molded into the underside of the cover of the battery container to receive in either heat-sealed or epoxy-bonded engagement the edges of the walls 14 and 15 and the partitions 16.

Access to the individual cell compartments 17 of the battery is provided by means of six cylindrical filler wells 20 which are integrally molded into the cover body. These filler wells each include a central bore which extends through cover body 12 into communication with respective ones of the cell compartments, and a sleeve-shaped body portion which projects downwardly from the bottom surface of the cover body. It is through these filler wells that testing and replenishment of the liquid electrolyte in each cell compartment is accomplished.

To prevent the electrolyte from spilling or splashing out through the filler wells, each filler well is fitted with a removeable non-vented cap 21. Since the illustrated battery is a remotely-vented type battery, no venting action is required through the filler wells and the caps 21 provided theron are of the non-vented type which seals the bores of the filler wells against the escape of both liquid and vapor from the cell compartments. The vent caps, which are preferably threaded into the outside ends of the filler well bores, may be entirely conventional in design and construction.

Electrical power is supplied to and withdrawn from the battery by conventional means in the form of positive and negative polarity battery terminals 22 and 23. These terminals, which may be conventional in design and construction, are connected to electrodes in the individual cell compartments of the battery in a manner well known to the art. Although the terminals are shown on the top surface of the battery container cover, it will be appreciated that other locations are possible in practicing the invention, including locations on a side wall of the battery container.

In accordance with the invention, gases generated during operation of the battery are collected from the individual battery cell compartments for release into the atmosphere at a remote location by means of a gas collection manifold 24 positioned within a complementarily dimensioned recess 27 on the underside of the battery cover body 12. Gases collected by this manifold are discharged through a discharge port 25 into a hollow tubing segment 26 for conveyance to a remote location.

As best seen in FIGS. 1-5, the gas collection manifold 24 is formed as a one-piece molded member generally in the form of a channel which is rectangular in cross-section and extends the length of the battery cover with an overlap at one end to provide for discharge port 25. The manifold is open along its top and bottom surfaces, being basically formed by two parallel-spaced side walls 30 and 31 (FIGS. 4 and 5) joined at either end by end walls 32 and 33. When seated in recess 27, the top surface of the channel abuts the rear surface of the recess to effectively close the top surface of the channel. The bottom surface of the channel remains open, and when the cover is installed on the base of the container, as shown in FIGS. 1-3, liquid and vapor communication is established between the manifold and each of the battery cell compartments. The discharge port 25, which is formed by a sleeve-shaped projection at the end of the manifold, does not communicate directly with any of the cell compartments by reason of being located on a portion of the manifold which extends beyond the periphery of the container base. Tubing segment 26 may be retained on the sleeve-shaped projection of the discharge port by frictional engagement, as shown, or by means of an appropriate coupling or compression fitting where a more positive engagement is required.

So as not to compromise the isolation between the individual battery cell compartments, manifold 24 is provided with a plurality of interior baffles 34-39 which extend between side walls 30 and 31 and serve to divide the interior of the manifold into six individual compartments 42 corresponding to the six underlying battery cell compartments 17 of the battery, and a seventh compartment 43 associated with gas discharge port 25. To obtain a more positive and mechanically rigid seal with the divider and end walls of the container base, a plurality of downwardly facing slot-shaped recesses 40 may be provided in association with each of interior baffles 34-39 to receive the edges of the corresponding interior or end wall.

Vapor communication is established between compartments 42 and compartment 43 by means of a plurality of notches 44 on the top edges of baffles 34-39. When the gas collection manifold is seated in recess 27, these notches form slot-like passageways between the manifold compartments which readily pass vapor, but effectively prevent the passage of liquid. As a result, escaping battery gas is conveyed to discharge port 25, while battery electrolyte is confined to the individual compartments. While the slot-shaped passageways have proven particularly effective for this purpose, it is contemplated that other forms of passageways, such as apertures through divider walls 34-39, could be used instead.

As a further obstacle to escape of electrolyte through the cell compartments, each of the cell compartments includes a generally horizontal V-shaped baffle 45 in which a vent aperture 46 is centrally disposed to allow the passage of battery gas from the associated cell compartment. The portions of compartments 42 which are above baffle 45 in effect constitute expansion chambers in which a gas egressing through the vent apertures expands, prior to passing through passageways 44 to gas discharge port 25. However, liquid electrolyte passing through vent apertures 46 is trapped within the expansion chambers, eventually flowing back to the associated battery cell compartment through the aperture by reason of the funnel-like shape of baffle 45. In addition to the V-shaped baffle shown, it will be appreciated that the baffles may take other forms, such as a downwardly-concave conical or hyperbolic form, where conditions dictate.

To prevent pressure build-up within the expansion chambers to a level which might interfere with the venting of battery gas through vent apertures 46, an additional pressure-relief aperture 47 may be provided on each baffle 45. This relief aperture serves to equalize pressure on either side of vent aperture 46, thereby assuring the free passage of battery gas through the vent aperture. To prevent blocking of aperture 47 from capillary action associated with the battery electrolyte, the bottom end of the aperture is preferably provided with a downwardly-projecting sleeve-shaped chimney 48.

Each of the compartments 42 in gas collection manifold 24 functions to separate gas and electrolyte egressing from its associated battery cell compartment. Once separated, the gas is conveyed through passageways 44 to compartment 43 and gas discharge port 25, from which it is conveyed to a remote location for venting.

Since no external seals are required to form the gas collection manifold, the cover can be more economically manufactured and the risk of gas leaks developing as a result of defective seals on the exterior surface of the cover is minimized. The gas collection manifold 24 and battery cover body 12 are preferably molded of an acid-resistant plastic material such as polypropylene. Since manifold 24 is permanently locked into place upon attachment of the battery cover base 12 to the battery container base, either by formation of a heat seal or by formation of an epoxy seal between the two elements, the need for an additional bonding operation to form the gas collection manifold is avoided.

In assembling the battery container, the container base, cover body, and gas collection manifold are first formed separately by conventional molding techniques. Then, the manifold is positioned in its recess on the cover body, the recess being dimensional for a snap-fit engagement. After the electrodes and other internal components of the battery have been installed in the container base, the cover is fitted over the base and bonded to obtain a vapor tight seal. This locks the manifold in place, avoiding the need for a separate operation to form the manifold.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A battery container for a remotely-vented multi-cell battery comprising in combination:
   a container base including side walls and a plurality of interior divider walls forming individual battery cell compartments therein;
   enclosure means for the battery including a cover carried on said container, said cover including a bottom surface portion engaging the walls of said container base, and further including a recess on said bottom surface communicating with each of said cell compartments and with the exterior of the battery compartment; and
   battery venting means including a gas collection manifold seated in said recess, said manifold communicating with each of said cell compartments and with a discharge port opening to the exterior of the battery, and defining with said cover vapor-sealed engagement with said walls of said container base whereby vapor communication with said cell compartments is restricted to said manifold.

2. A battery container as defined in claim 1 wherein said recess and said manifold are dimensioned to provide a friction locked engagement between said manifold and said cover.

3. A battery container as defined in claim 1 wherein said manifold comprises a channel open along one side, and wherein said manifold is seated in said recess with said open side thereof in abutting engagement with the bottom surface of said recess.

4. A battery container as defined in claim 1 wherein said manifold includes a plurality of interior divider walls forming individual compartments within said manifold corresponding to respective ones of said battery cell compartments.

5. A battery container as defined in claim 4 wherein each of said compartments includes an interior baffle having a vent aperture therethrough opening into the respective one of said cell compartments.

6. A battery container as defined in claim 5 wherein said interior baffles are generally horizontal and V-shaped, and wherein said vent aperture is generally centrally disposed therein.

7. A battery container as defined in claim 5 wherein said compartments each include at least one additional aperture for equalizing vapor pressures on opposite sides of said vent aperture.

8. A battery container as defined in claim 4 wherein said divider walls each include at least one notch proximate said open side of said manifold for establishing vapor communication between adjacent manifold compartments.

9. A battery container as defined in claim 1 wherein said cover and said gas collection manifold are each molded as a one-piece integral member.

10. A battery container for a remotely-vented multi-cell battery comprising, in combination:
    a container base including side walls and a plurality of interior divider walls forming individual battery cell compartments therein;
    enclosure means for the battery including a cover carried on said container base, said cover including a bottom surface portion engaging the walls of said container base, and further including a recess on said bottom surface communicating with each of said cell compartments and with the exterior of the battery compartment; and
    battery venting means including a gas collection manifold seated in said recess, said manifold including a plurality of individual compartments each including a vent aperture communicating with a respective one of said cell compartments and with a discharge port opening to the exterior of the battery, and defining with said cover vapor-sealed engagement with said walls of said container base whereby vapor communication with said cell compartments is restricted to said manifold.

11. A battery container as defined in claim 10 wherein said manifold comprises a channel open along one side, said individual compartments being formed by a plurality of interior divider walls extending between opposing sides thereof, and wherein said manifold is seated in said recess with said open side thereof in abutting engagement with the bottom surface of said recess.

12. A battery container as defined in claim 11 wherein each of said compartments includes a generally horizontal V-shaped interior baffle, said vent aperture being centrally disposed therein and extending therethrough to the respective one of said battery cell compartments.

13. A battery container as defined in claim 11 wherein said interior divider walls each include at least one notch proximate said open side of said manifold for establishing vapor communication between adjacent manifold compartments.

14. A battery container as defined in claim 10 wherein said recess and said manifold are dimensioned to provide a friction locked engagement between said manifold and said cover.

15. A battery container as defined in claim 10 wherein said cover and said gas collection manifold are each molded as a one-piece integral member.

16. A cover for a remotely-vented multi-cell battery container base of the type having side walls and a plurality of interior divider walls forming individual battery cell compartments, comprising, in combination:
enclosure means including a cover having a bottom surface portion for engaging the walls of the container base, and having a recess on said bottom surface for communicating with each of said cell compartments and with the exterior of the battery compartment, for forming when installed on the base an enclosure for the battery; and
battery venting means including a gas collection manifold seated in said recess for communication with each of said cell compartments and including a discharge port for opening to the exterior of the battery, and defining with said cover vapor-sealed engagement with said walls of the container base when said cover is installed thereon, whereby vapor communication with said cell compartments is restricted to said manifold.

17. A cover for a battery container as defined in claim 16 wherein said recess and said manifold are dimensioned to provide a friction-locked engagement between said manifold and said cover.

18. A cover for a battery container as defined in claim 16 wherein said gas collection manifold comprises a channel open along one side, and wherein said manifold is seated in said recess with said open side thereof in abutting engagement with the bottom surface of said recess.

19. A cover for a battery container as defined in claim 16 wherein said manifold includes a plurality of interior divider walls forming individual compartments within said manifold corresponding to respective ones of said battery cell compartments.

20. A cover for a battery container as defined in claim 19 wherein each of said compartments includes an interior baffle having a vent aperture therethrough opening into the respective one of said battery cell compartments.

21. A cover for a battery container as defined in claim 20 wherein said interior baffles are generally horizontal and V-shaped and wherein said vent aperture is generally centrally disposed therein.

22. A cover for a battery container as defined in claim 20 wherein said compartments each include at least one additional aperture for equalizing vapor pressures on opposite sides of said vent aperture.

23. A cover for a battery container as defined in claim 19 wherein said divider walls each include at least one notch proximate said open side of said manifold for establishing vapor communication between adjacent manifold compartments.

24. A cover for a battery container as defined in claim 16 wherein said cover and said gas collection manifold are each molded as a one-piece integral member.

25. A cover for a remotely-vented multi-cell battery container base of the type having a side walls and a plurality of interior divider walls forming individual battery cell compartments, comprising, in combination:
enclosure means including a cover having a bottom surface portion for engaging the walls of the container base, and having a recess on said bottom surface for communicating with each of said cell compartments and with the exterior of the battery compartment, for forming when installed on the base an enclosure for the battery; and
battery venting means including a gas collection manifold seated in said recess, said manifold including a plurality of individual compartments each including a vent aperture for communication with a respective one of the cell compartments and including a discharge port opening to the exterior of the battery, and defining with said cover vapor-sealed engagement with said walls of said container base when said cover is installed thereon, whereby vapor communication with said cell compartments is restricted to said manifold.

26. A cover for a battery container as defined in claim 25 wherein said manifold comprises a channel open along one side, said individual compartments being formed by a plurality of interior divider walls extending between opposing sides thereof, and wherein said manifold is seated in said recess with said open side thereof in abutting engagement with the bottom surface of said recess.

27. A cover for a battery container as defined in claim 26 wherein each of said compartments includes a generally horizontal V-shaped interior baffle, said vent aperture being generally centrally disposed therein and extending therethrough to the respective one of said battery cell compartments.

28. A cover for a battery container as defined in claim 26 wherein said interior divider walls each include at least one notch proximate said open side of said manifold for establishing vapor communication between adjacent manifold compartments.

29. A cover for a battery container as defined in claim 25 wherein said recess and said manifold are dimensioned to provide a friction-locked engagement between said manifold and said cover.

30. A cover for a battery container as defined in claim 25 wherein said cover and said gas collection manifold are each molded as a one-piece integral member.

* * * * *